United States Patent [19]

Kuwabara et al.

[11] 4,145,462
[45] Mar. 20, 1979

[54] PROCESS FOR PRODUCING SOLAR COLLECTORS

[75] Inventors: Masamichi Kuwabara, Yao; Mitsuo Sasaki, Tondabayashi; Sigeru Uema, Yao; Youkichi Taniguchi, Nara; Noboru Fukuchi, Kashiwara; Tohru Kimura, Nara, all of Japan

[73] Assignee: Toyo Aluminium Kabushiki Kaisha, Japan

[21] Appl. No.: 800,555

[22] Filed: May 25, 1977

[30] Foreign Application Priority Data

Jun. 9, 1976 [JP] Japan .................................. 51/69116
Jun. 19, 1976 [JP] Japan .................................. 51/72657

[51] Int. Cl.$^2$ ............................ B05B 5/00; F24J 3/02; C23F 7/00
[52] U.S. Cl. ................................. 427/160; 27/372 A; 27/372 B; 27/435; 126/270; 148/6.27

[58] Field of Search .......... 148/623; 427/160, 372 A, 427/372 B, 435; 126/270; 165/DIG. 15

[56] References Cited

U.S. PATENT DOCUMENTS

| | | | |
|---|---|---|---|
| 1,540,766 | 6/1925 | Danials | 148/6.27 |
| 1,608,775 | 11/1926 | Danials | 148/6.27 |
| 1,846,844 | 2/1932 | Clark | 148/6.27 |
| 3,471,674 | 7/1976 | Brandt | 427/160 |

*Primary Examiner*—Michael F. Esposito
*Assistant Examiner*—Richard Bueker
*Attorney, Agent, or Firm*—Wenderoth, Lind & Ponack

[57] ABSTRACT

A process for producing solar collectors of aluminum or aluminum alloys having a selective absorptive coating. Aluminum or its alloy is dipped in a hot aqueous solution containing a silicate. Aluminum alloys can be also used which contain alloying elements such as iron, copper, titanium, nickel, silver and gold.

5 Claims, 4 Drawing Figures

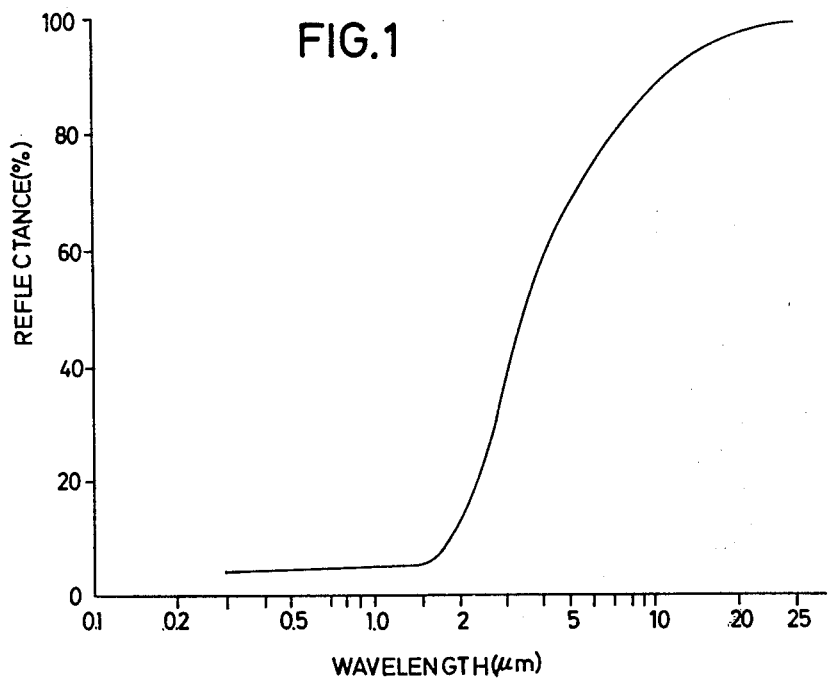
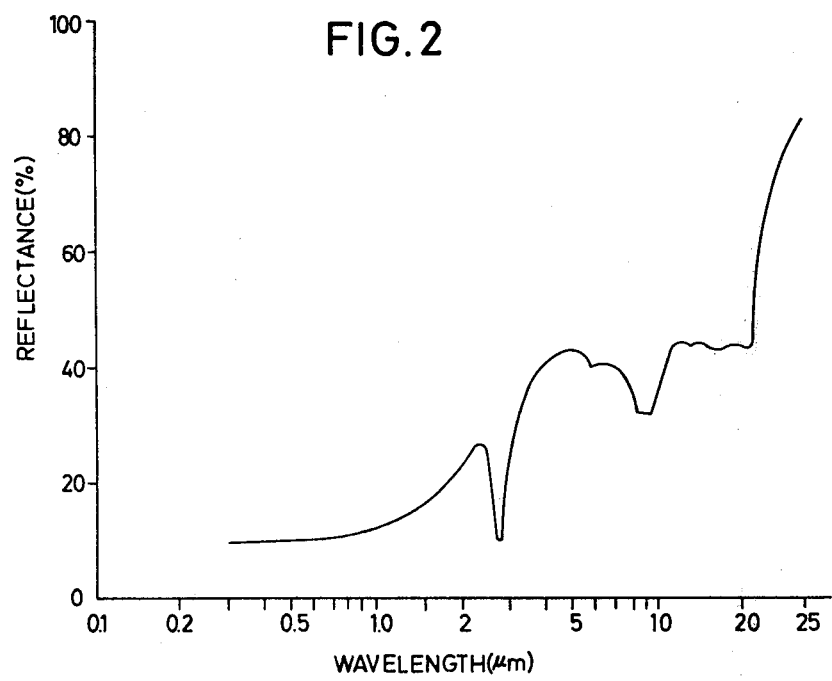

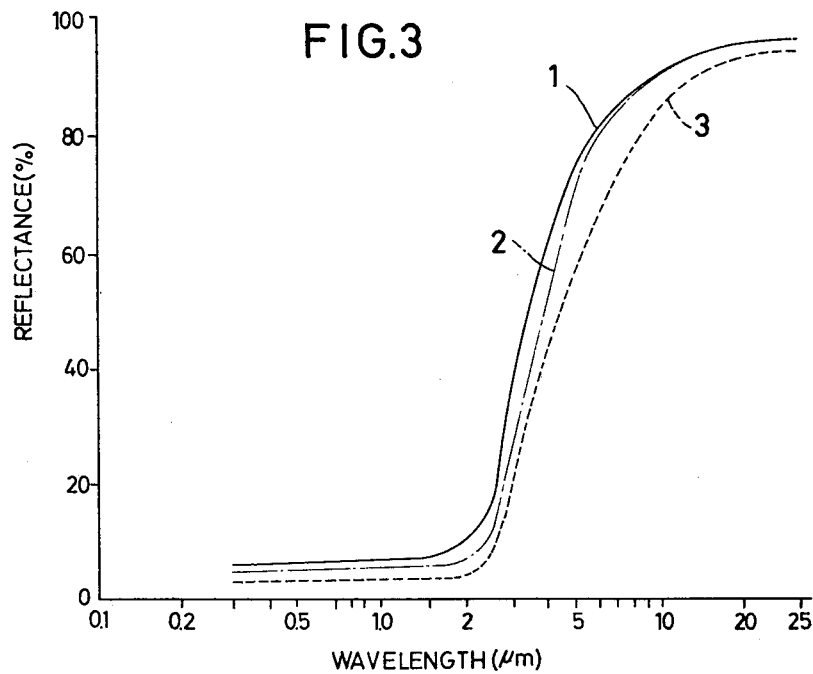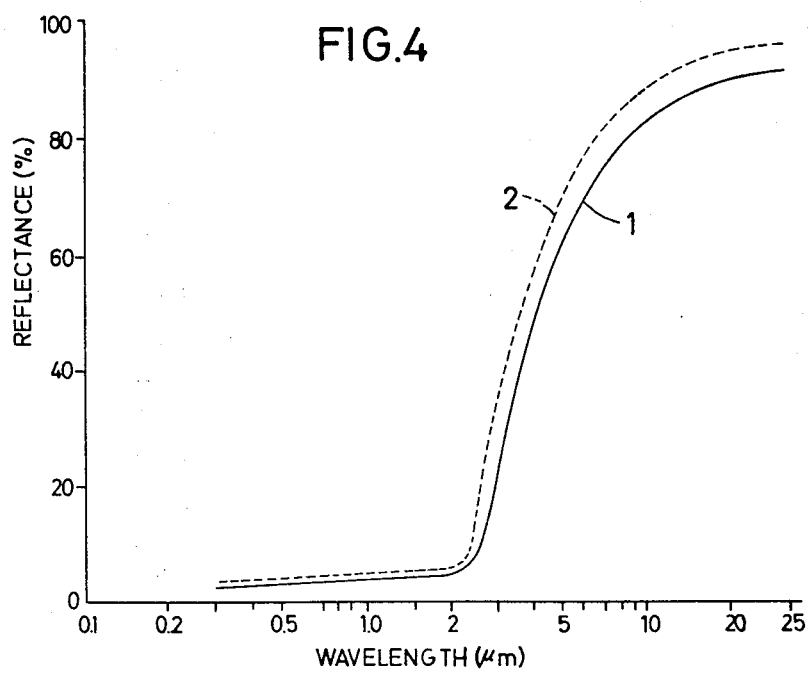

PROCESS FOR PRODUCING SOLAR COLLECTORS

The present invention relates to a process for manufacturing solar collectors of aluminum or its alloys, and, more particularly, to a process in which aluminum or its alloy as substrate is dipped in a hot aqueous solution containing a silicate to form on the substrate a black coating with an excellent spectral selectivity.

In recent years, many studies have been made on solar collectors. Among them are copper sheets with copper oxide coating, copper or steel sheets with nickel-black or chromium-black thereon, and so on.

Aluminum is considered to be a very suitable material as a substrate for solar collectors because of its high thermal conductivity and low cost. However, no commercially acceptable aluminum solar collector with a good selective surface layer has been produced. Insofar as we are aware, only a few methods have been proposed to give a spectral selectivity to the surface of aluminum or its alloy. The following two processes, for example, have been proposed:

(1) A process comprising the steps of anodizing aluminum to form a porous oxide film on its surface and then treating in an electrolyte containing metallic salts to deposit metals oor metallic oxides in the pores in the oxide film. (Japanese Patent Laying-Open No. SHO 51-3333)

(2) A process comprising the steps of subjecting aluminum to metallic cementation with copper and thickening and brightening treatments of the copper layer through a conventional electroplating, and then dipping it in an alkaline solution containing a suitable oxidizing agent to form a selective coating on the plated surface. (Japanese Patent Laying-Open No. SHO 50-141531)

However, these prior processes have the following shortcomings: In the former process, the porous oxide film has to be at least 15 micron thick to form a selective surface by the deposition of metals or metallic oxides in the pores. The resultant selective surface shows a poor spectral selectivity because strong and broad absorption bands due to aluminum oxide appear in the infrared region, causing a large heat loss. The latter process involves two steps, that is, the formation of copper layer on the substrate and that of a selective absorption coating on the copper layer. Further, these steps produce waste liquid to be disposed of. This complicates the process and increases the manufacturing cost.

The present invention provides a simplified process for manufacturing solar collectors of aluminum or its alloys having an excellent spectral selectivity.

The process according to the present invention comprises the step of dipping aluminum or its alloy in a hot aqueous solution containing 5-100 mg/l (in terms of $SiO_2$) of a silicate to form thereon a selective absorption coating.

The present invention also provides a process for manufacturing solar collectors of aluminum alloys containing at least one alloying elements selected from the group consisting of iron, copper, titanium, nickel, silver and gold.

FIGS. 1-4 represent the spectral reflectance (as a function of wavelength) of aluminum surfaces after treatment by various embodiments of the invention.

Described in more detail, the aluminum used in the process according to this invention has a purity of preferably 97% or higher, more preferably, 99.0% or higher. The aluminum or aluminum alloy used may be in the form of a sheet, foil or any other configuration.

The silicates used in the process according to the present invention should be water soluble and are preferably selected from the group consisting of sodium orthosilicate ($Na_4SiO_4$), sodium metasilicate ($Na_2SiO_3$), potassium metasilicate ($K_2SiO_3$), potassium tetrasilicate ($K_2Si_4O_9 \cdot H_2O$) and water glass.

The concentration of the silicate should be in the range of 5-100 mg (in terms of $SiO_2$) per liter of water. A concentration of silicate less than the lower limit would give only uncolored coatings on the substrate. On the contrary, a concentration of silicate more than the upper limit would cause corrosive attack on the substrate and produce thereon a rugged surface with a poor spectral selectivity.

The pH of the silicate solution should preferably be 7.5–11.0 (more preferably 8.0–10.5). And the temperature thereof is preferably 80° C. or higher. At a temperature lower than 80° C., a good selective coating would not be formed even if the substrate is dipped in the solution for a prolonged time.

Also, it was found that further addition of other metallic ions such as zinc, magnesium, calcium, strontium or beryllium to the silicate solution promotes the blackening of substrate surface, thus improving its spectral selectivity. Even if a deep black coating can not be obtained in a solution containing silicate alone, the addition of one or more of such metallic ions brings satisfactory results without the necessity of changing other treating conditions.

The concentration of these metallic ions should be preferably in the following ranges:
Zinc: 3–30 mg/l
Magnesium: 5–35 mg/l
Calcium: 1—20 mg/l
Strontium: 1–20 mg/l
Beryllium: 1–20 mg/l Deionized or distilled water is preferably used to prepare the silicate solution to minimize ill effect of other ions on the spectral selectivity of the coating formed. The specific resistance of the deionized and distilled water is preferably 1 M$\Omega$ cm or higher for the former and 0.1 M$\Omega$ or higher for the latter. However, the water used in the present invention is not limited to deionized or distilled water. It has been proven that a brown or black coating with a good spectral selectivity can be formed with the use of water containing small amounts of iron, potassium and/or chromium ions. The maximum allowable concentrations are 1.0, 8.0 and 1.0 mg/l for iron, potassium and chromium ions, respectively.

Further, we have studied as to what kinds of aluminum alloys are suitable as the substrate used in the process according to the present invention. Twenty one aluminum alloys were prepared by adding 0.5 percent by weight of each of the following alloying elements to 99.99 percent pure aluminum. The alloying elements used were beryllium, boron, magnesium, silicon, titanium, vanadium, chromium, manganese, iron, cobalt, nickel, copper, zinc, zirconium, molybdenum, silver, cadmium, tin, antimony, tantalum and gold.

These aluminum alloys and 99.99 percent pure aluminum in the form of sheet were degreased and dipped for 30 minutes in a hot alkaline aqueous solution containing 25.0 mg/l (in terms of $SiO_2$) of sodium orthosilicate. The change in color of the sheets was as shown in Table 1.

Table 1

| Color of coating | Test sheets |
| --- | --- |
| No change in color | 99.99% pure aluminum |
| | Al-Mg, Al-Zn, Al-Cd, Al-Sn alloys |
| Ashy brown | Al-Be, Al-Si, Al-Cr, Al-Mn, Al-Zr, Al-Mo, Al-Sb alloys |
| Dark brown | Al-B, Al-V, Al-Co, Al-Ta alloys |
| Black | Al-Ti, Al-Fe, Al-Ni, Al-Cu, Al-Ag, Al-Au alloys |

The experiment has revealed that aluminum alloys containing a small amount of Fe, Ni, Ti, Cu, Ag or Au are suitable as a substrate for the formation of black coating.

We have also found that aluminum alloys containing one or more of these alloying elements can provide a coating with excellent spectral selectivity if the amount thereof is within the following ranges:

Fe: 0.05–2.0% by weight
Cu: 0.05–4.0%
Ti: 0.05–4.0%
Ni: 0.03–1.0%
Ag: 0.05–1.0%
Au: 0.05–0.5%

For smaller amounts than the lower limits, the coating formed on any alloys would be pale brown and show a poor spectral selectivity. For larger amounts than the upper limits, the black coating formed would be dirty and have a poor spectral selectivity because uncolored intermetallic compounds and corrosion pits remain.

The process according to the present invention has the following advantages:

(1) It provides a selective absorption surface which can convert solar energy into thermal energy with high efficiency.

(2) Its simplicity makes it practical at a reasonable cost.

(3) No use of harmful heavy metallic salts precludes any water pollution problem.

The present invention will be understood more readily with reference to the following examples, which are not to be construed to limit the scope of the invention. Unless otherwise stated, amounts are given in percent by weight and the amount of silicate is given in terms of $SiO_2$.

EXAMPLE 1

Using deionized water (of which specific resistance was higher than 1 MΩ cm), aqueous solutions containing sodium orthosilicate in the amounts as shown in Table 2 were prepared. These solutions were then adjusted to pH 9.5 (at 30° C.) by addition of a few drops of dilute ammonia water or dilute sulfuric acid solution.

An aluminum sheet (AA-1100) about 0.5 mm thick was first immersed in a 10% caustic soda solution at 60° C. for 1 minute so as to remove rolling oil and thin oxide film on the surface without spoiling its original surface brightness. The sheet was immersed in each of the silicate solutions at 95° C. for 10 minutes. This treatment formed colored coatings on the sheets as in Table 2. Any coatings showed a spectral selectivity, depending on the extent of coloring.

Table 2

| Amount of sodium orthosilicate (in mg/l) | Extent of coloring |
| --- | --- |
| 0 | No change |
| 5 | Light brown |
| 10 | Brown |
| 20 | Dark brown |
| 30 | Black |
| 40 | " |
| 60 | " |
| 80 | Dark brown |
| 100 | Ashy brown |

FIG. 1 shows the spectral reflectance of the coating formed by dipping an aluminum sheet in the solution containing 40 mg/l of sodium orthosilicate. It is clear from FIG. 1 that the coating has an excellent selective surface which shows high spectral absorptance of 85–96% in the visible and near-infrared regions (0.30–2.0 micrometers in wavelength) and simultaneously, low spectral emittance of 3–25% in the infrared region (wavelength longer than 6 micrometers).

EXAMPLE 2

Aqueous solutions containing 3, 7 and 14 mg/l of potassium metasilicate, respectively, were prepared with deionized water and their pH were adjusted in the same way as in Example 1. Aluminum alloy sheets (AA-3003) degreased in the same way as in Example 1 were dipped in each of these silicate solutions at 80° C. for 10 minutes. Coatings of such colors as in Table 3 were formed on their surface. Any coatings showed a spectral selectivity, depending on the extent of coloring.

Table 3

| Amount of potassium metasilicate (in mg/l) | Extent of coloring |
| --- | --- |
| 0 | No change |
| 3 | Light brown |
| 7 | Black |
| 14 | " |

EXAMPLE 3

An aqueous solution containing 10 mg/l of sodium metasilicate was prepared in the same manner as in Example 1 and its pH was adjusted to 9.5 by addition of triethanolamine. An aluminum sheet (AA-1100) degreased in the same manner as in Example 1 was immersed in the solution at 95° C. for 10 minutes. A black coating was formed thereon and showed an excellent spectral selectivity.

EXAMPLE 4

A solution containing 16.3 mg/l of sodium orthosilicate and 20.0 mg/l (in terms of Mg ion) of magnesium sulfate was prepared and adjusted to pH 9.5 in the same manner as in Example 1, and then heated to boiling. A degreased aluminum sheet (AA-1100) was immersed in the solution for 10 minutes. A black coating was formed thereon and it showed a good spectral selectivity.

EXAMPLE 5

A solution containing 16.3 mg/l of sodium orthosilicate and 10.0 mg/l (in terms of Zn ion) of zinc sulfate was prepared and adjusted to pH 10.0 in the same manner as in Example 1, and then heated to boiling. A degreased aluminum sheet (AA-1100) was dipped in the solution for 10 minutes. A black coating was formed thereon and it showed a good spectral selectivity.

EXAMPLE 6

A solution containing 16.3 mg/l of sodium orthosilicate, 10.0 mg/l (in terms of Mg ion) of magnesium sulfate and 5.0 mg/l (in terms of Zn ion) of zinc sulfate was prepared and adjusted to pH 9.5 in the same manner as in Example 1 and then heated to boiling. A degreased aluminum sheet (AA-1100) was dipped therein for 10 minutes and a black coating was formed. It showed a good spectral selectivity.

EXAMPLE 7

A solution was prepared by adding 4.3 mg/l of sodium orthosilicate, 5.0 mg/l (in terms of Ca ion) of calcium sulfate and 10.0 mg/l (in terms of Be ion) of beryllium sulfate to city water containing 12 mg/l of $SiO_2$, 0.08 mg/l of Fe ion and 5.4 mg/l of K ion. It was adjusted to pH 10.5 by adding a dilute sodium hydroxide solution and then heated to boiling. A degreased aluminum sheet (AA-1100) was immersed therein for 10 minutes. A black coating formed thereon was similar to the ones formed in solutions prepared with deionized water and showed a good spectral selectivity.

EXAMPLE 8

With deionized water, a solution containing 6 mg/l of sodium orthosilicate and 12 mg/l (in terms of Zn ion) of zinc sulfate was prepared and adjusted to pH 9.5 by adding dilute ammonia solution. An aluminum sheet (AA-1100) was degreased by dipping in 1% caustic soda solution at 60° C. for 1 minute, and then treated for 10 minutes in the silicate solution at 92°-95° C. The black coating was formed thereon and showed an excellent spectral selectivity.

EXAMPLE 9

With distilled water, a solution containing 24 mg/l of sodium orthosilicate was prepared, adjusted to pH 10.0 by the addition of dilute sulfuric acid solution and heated to boiling. A degreased aluminum sheet (AA-1100) was dipped in the solution for 10 minutes. The coating formed on the surface was black and showed an excellent spectral selectivity.

EXAMPLE 10

Using deionized water, an aqueous solution containing 20 mg/l of sodium orthosilicate and 1 mg/l (in terms of Fe ion) of iron sulfate was prepared and heated to boiling. A degreased AA-1100 aluminum sheet was dipped for an hour in the solution. FIG. 2 shows the spectral reflectance of the black coating formed on the sheet. The spectrum shows that the coating has a fairly good spectral selectivity although it shows only a slight absorption in the infrared region. It is, therefore, obvious that the presence of 1 mg/l of Fe ion does not impart any detrimental effect to the formation of spectral absorptive surface.

EXAMPLE 11

To 99.99% aluminum was added
(1) 0.1% of iron
(2) 0.1% of silver, and
(3) 0.1% of nickel
to prepare three kinds of aluminum alloy sheets. These sheets were degreased in the same manner as in Example 1. 25.0 mg of sodium orthosilicate was added to 1 liter of distilled water and the solution was heated to 95° C. Each degreased sheet was dipped in the hot solution for 30 minutes. The coatings formed on any sheets were black and showed excellent spectral selectivity as seen from FIG. 3 in which curves (1), (2) and (3) are for alloys containing iron, silver and nickel, respectively.

EXAMPLE 12

To 99.99% aluminum were added
(1) 1.5% of copper and 0.5% of iron
(2) 0.05% of nickel, 0.5% of iron and 0.1% of copper
to prepare two kinds of aluminum alloy sheets. They were treated in the same solution and under the same conditions as in Example 11. On any sheets were formed a black coating which showed good spectral selectivity, as will be seen from FIG. 4 in which curves (1) and (2) are for the abovementioned two sheets, respectively.

EXAMPLE 13

As examples of aluminum alloy sheets containing two or more alloying elements, sheets of such composition as indicated in Table 4 were prepared and treated in the same manner as in Example 11. On any sheets was formed a black coating which showed excellent selective absorption. The table 4 shows the spectral reflectances of coating formed on each alloy sheet at different wavelengths.

Table 4

| Composition of aluminum alloy sheets | | Reflectance (%) at different wavelengths (in $\mu m$) | | |
|---|---|---|---|---|
| | | 0.5 | 5.0 | 20.0 |
| Al: 99.89%, Au: 0.05% | Ag: 0.06% | 10.2 | 78.3 | 95.5 |
| Al: 99.24%, Ti: 0.3%, | Fe: 0.4% Ag: 0.06% | 8.1 | 65.7 | 92.6 |
| Al: 99.8%, Ni: 0.05% | Cu: 0.1% Au: 0.05% | 6.3 | 66.0 | 91.8 |
| Al: 99.15%, Ni: 0.05%, | Fe: 0.5% Cu: 0.3% | 6.9 | 68.1 | 93.0 |
| Al: 99%, Ti: 0.5% | Fe: 0.5% | 8.6 | 67.0 | 92.5 |
| Al: 99%, Ni: 0.5% | Fe: 0.5% | 6.0 | 60.4 | 90.0 |
| Al: 99.4%, Ag: 0.1% | Fe: 0.5% | 8.9 | 71.1 | 92.6 |
| Al: 99.4%, Au: 0.1% | Fe: 0.5% | 7.0 | 65.3 | 90.5 |
| Al: 99.4%, Ni: 0.1% | Ti: 0.5% | 9.5 | 73.6 | 94.7 |

It will be understood from the foregoing that the present invention provides a simpler method for producing solar collectors with good selective characteristics.

There will now be obvious to those skilled in the art many modifications and variations within the scope of the present invention.

What is claimed is:

1. A process for manufacturing solar collectors which consists essentially of the step of dipping aluminum or aluminum alloy in a hot alkaline aqueous solution containing 5-100 mg, in terms of $SiO_2$, of a silicate per liter of water, whereby there is formed a selective absorption coating thereon, wherein said hot aqueous solution further contains at least one kind of ions selected from the group consisting of zinc, magnesium, calcium, strontium and beryllium in the amounts of 3-30 mg/l, 5-35 mg/l, 1-20 mg/l, 1-20 mg/l and 1-20 mg/l, respectively.

2. A process according to claim 1 wherein said hot alkaline aqueous solution is at 80° C. or higher.

3. A process according to claim 1 wherein the water used for preparing said alkaline aqueous solution is deionized or distilled.

4. A process according to claim 1 wherein the contents of iron, potassium and chromium ions in the water used for preparing said alkaline aqueous solution are 1.0 mg/l or less, 8.0 mg/l or less and 1.0 mg/l or less, respectively.

5. A process according to claim 1 wherein said aluminum alloy contains at least one alloying element selected from the group consisting of iron, copper, titanium, nickel, silver and gold in the amounts of 0.05–2.0% by weight, 0.05–4.0%, 0.05–1.0%, 0.03–1.0%, 0.05–1.0% and 0.05–0.5%, respectively.

* * * * *